US010356359B2

(12) United States Patent
Ohnishi

(10) Patent No.: US 10,356,359 B2
(45) Date of Patent: *Jul. 16, 2019

(54) INFORMATION PROCESSING APPARATUS, METHOD FOR CONTROLLING THE INFORMATION PROCESSING APPARATUS, AND RECORDING MEDIUM

(71) Applicant: CANON KABUSHIKI KAISHA, Tokyo (JP)

(72) Inventor: Shinji Ohnishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 144 days.

This patent is subject to a terminal disclaimer.

(21) Appl. No.: 15/582,427

(22) Filed: Apr. 28, 2017

(65) Prior Publication Data

US 2017/0237936 A1    Aug. 17, 2017

Related U.S. Application Data

(63) Continuation of application No. 14/468,169, filed on Aug. 25, 2014, now Pat. No. 9,667,825.

(30) Foreign Application Priority Data

Aug. 27, 2013    (JP) ................. 2013-175899

(51) Int. Cl.
*H04N 1/21*    (2006.01)
*H04N 5/77*    (2006.01)
(Continued)

(52) U.S. Cl.
CPC ............ *H04N 5/915* (2013.01); *G06F 16/54* (2019.01); *H04N 1/212* (2013.01);
(Continued)

(58) Field of Classification Search
CPC .... H04N 1/2112; H04N 1/212; H04N 1/2129; H04N 1/2104; H04N 5/23293; G06F 17/30274

See application file for complete search history.

(56) References Cited

U.S. PATENT DOCUMENTS 9,667,825 B2 *    5/2017    Ohnishi ................. H04N 1/212
2003/0184658 A1*    10/2003    Fredlund ................ H04N 5/765
                                                                          348/220.1

(Continued)

FOREIGN PATENT DOCUMENTS

JP    2008-067334 A    3/2008
JP    2009-253457 A    10/2009

*Primary Examiner* — Daniel M Pasiewicz
(74) *Attorney, Agent, or Firm* — Canon U.S.A. Inc., IP Division

(57) ABSTRACT

There is provided an information processing apparatus, and a method to improve operability of the information processing apparatus when a user manages still image files in a case where a still image is extracted from a moving image file and stored as a still image file. In information processing apparatus and the method, a moving image file is selected from a plurality of moving image files and is reproduced, and a folder corresponding to the selected moving image file is created. A still image file is generated based on a video frame extracted from the moving image file being reproduced, and the generated still image file is stored into the created folder in association with the folder. When another moving image file is selected, another folder is newly created, and a still image file generated from the other moving image file being reproduced is stored into the other folder.

9 Claims, 3 Drawing Sheets

(51) Int. Cl.
*G06F 16/54* (2019.01)
*H04N 5/232* (2006.01)
*H04N 5/915* (2006.01)
(52) U.S. Cl.
CPC ....... *H04N 1/2129* (2013.01); *H04N 5/23293* (2013.01); *H04N 5/77* (2013.01); *H04N 2201/0012* (2013.01); *H04N 2201/0084* (2013.01); *H04N 2201/212* (2013.01)

(56) References Cited

U.S. PATENT DOCUMENTS

| | | | | |
|---|---|---|---|---|
| 2006/0050321 | A1* | 3/2006 | Takahashi | H04N 1/2112 358/296 |
| 2006/0152600 | A1* | 7/2006 | Hamada | H04N 1/2137 348/231.99 |
| 2007/0139534 | A1* | 6/2007 | Tsushio | H04N 1/2112 348/231.99 |
| 2009/0285565 | A1* | 11/2009 | Nakamura | H04N 5/232 386/326 |
| 2010/0097642 | A1* | 4/2010 | Sumi | H04N 1/00244 358/1.15 |
| 2011/0013882 | A1* | 1/2011 | Kusunoki | G11B 27/034 386/241 |
| 2014/0189761 | A1* | 7/2014 | Sood | H04N 21/26283 725/92 |
| 2015/0104147 | A1* | 4/2015 | Kosaka | G06F 17/30784 386/239 |

* cited by examiner

INFORMATION PROCESSING APPARATUS, METHOD FOR CONTROLLING THE INFORMATION PROCESSING APPARATUS, AND RECORDING MEDIUM

CROSS-REFERENCE TO RELATED APPLICATIONS

This application is a continuation, and claims the benefit, of U.S. patent application Ser. No. 14/468,169, presently pending and filed on Aug. 25, 2014, and claims the benefit of, and priority to, Japanese Patent Application No. 2013-175899 filed Aug. 27, 2013, which applications are hereby incorporated by reference herein in their entireties.

BACKGROUND OF THE INVENTION

Field of the Invention

The present invention relates to a technique for extracting a still image from a moving image file and storing the still image as a still image file.

Description of the Related Art

Conventionally, still image data is clipped from a moving image file and stored as a still image file, and a character string containing a file name of the moving image file and a frame number of the still image data is used as a file name of the still image file as discussed, for example, in Japanese Patent Application Laid-Open No. 2005-86345.

To date, it is possible to sort still image files according to moving image files by displaying the still image files sorted, for example, by file names. There is, however, a problem in that browsability is degraded when a large number of still image files are generated from a plurality of moving image files and are then stored. In addition, there is another problem in that an operation for collectively selecting still image files according to an original moving image file becomes troublesome. Furthermore, it is not possible to discriminate still image files generated from the same moving image file according to units in which the still image files have been extracted.

SUMMARY OF THE INVENTION

According to an aspect of the present invention, an information processing apparatus includes a selection unit configured to select a moving image file from a plurality of moving image files, a reproduction unit configured to reproduce the selected moving image file, a creation unit configured to create a folder corresponding to the selected moving image file, a generation unit configured to generate a still image file based on a video frame extracted from the moving image file, and a storage unit configured to store the generated still image file into the created folder so as to be associated with the created folder. The creation unit newly creates another folder upon the selection unit selecting another moving image file, and the storage unit stores a still image file generated from the other moving image file into the other folder.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings. It should be noted that the components described in this exemplary embodiment are merely examples, and the scope of the invention is not limited to these components.

Figure 1:
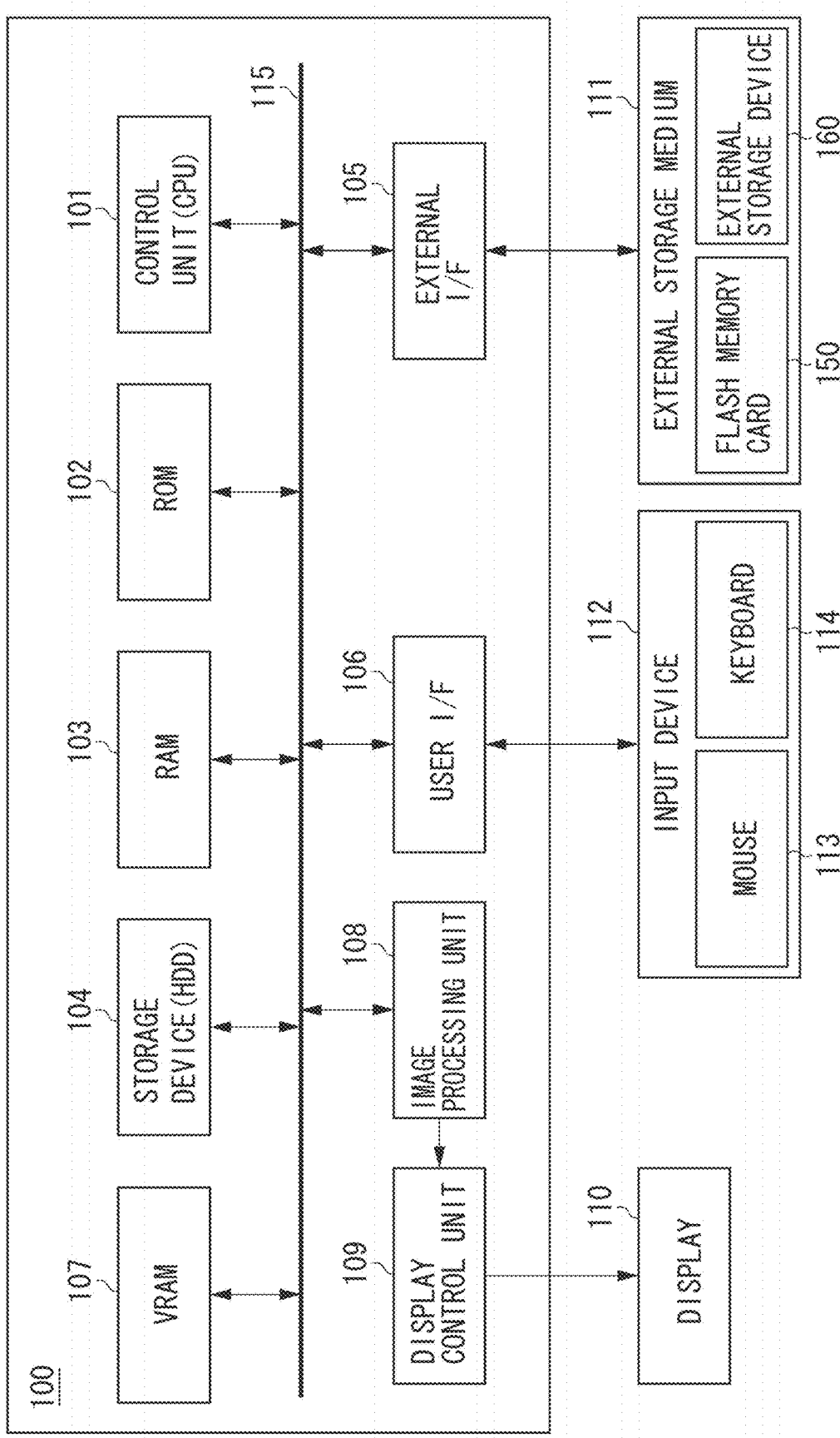
FIG. 1 is a block diagram illustrating an example of a configuration of an information processing apparatus according to an exemplary embodiment of the present invention.

FIG. 1 is a block diagram illustrating an example of a configuration of an information processing apparatus according to the present exemplary embodiment. An information processing apparatus 100 is realized, for example, by a computer apparatus, such as a personal computer and a smartphone.

The information processing apparatus 100 includes a control unit (e.g., CPU) 101, a read only memory (ROM) 102 for storing a control program that describes processing procedures performed by the control unit 101, and a random access memory (RAM) 103 serving as a work memory for temporarily storing the control program, data, and so on. In addition, the information processing apparatus 100 includes a storage device (e.g., HDD) 104 for storing programs, such as an image processing application and an operating system (OS), and content data, such as a moving image file and a still image file. The information processing apparatus 100 further includes an external interface 105 for connecting an external recording medium 111, such as a flash memory card 150 and an external storage device 160, to the information processing apparatus 100. Furthermore, the information processing apparatus 100 includes a user interface 106 for processing input based on a user operation input through an input device 112, such as a mouse 113, a keyboard 114, and a touch panel. The information processing apparatus 100 further includes a video RAM (VRAM) 107 for storing an image to be displayed on a display 110, an image processing unit 108, a display control unit 109, and the display 110. Each of these blocks is connected to an internal bus 115, which is a transmission path for a control signal, a data signal, and so on. The information processing apparatus 100 may be realized by a single computer apparatus, or may be realized by a plurality of computer apparatuses by distributing functions among the plurality of computer apparatuses, as necessary. In a case in which the information processing apparatus 100 includes a plurality of computer apparatuses, the computer apparatuses are interconnected through a local area network (LAN) or the like, which enables mutual communication.

Figure 2:
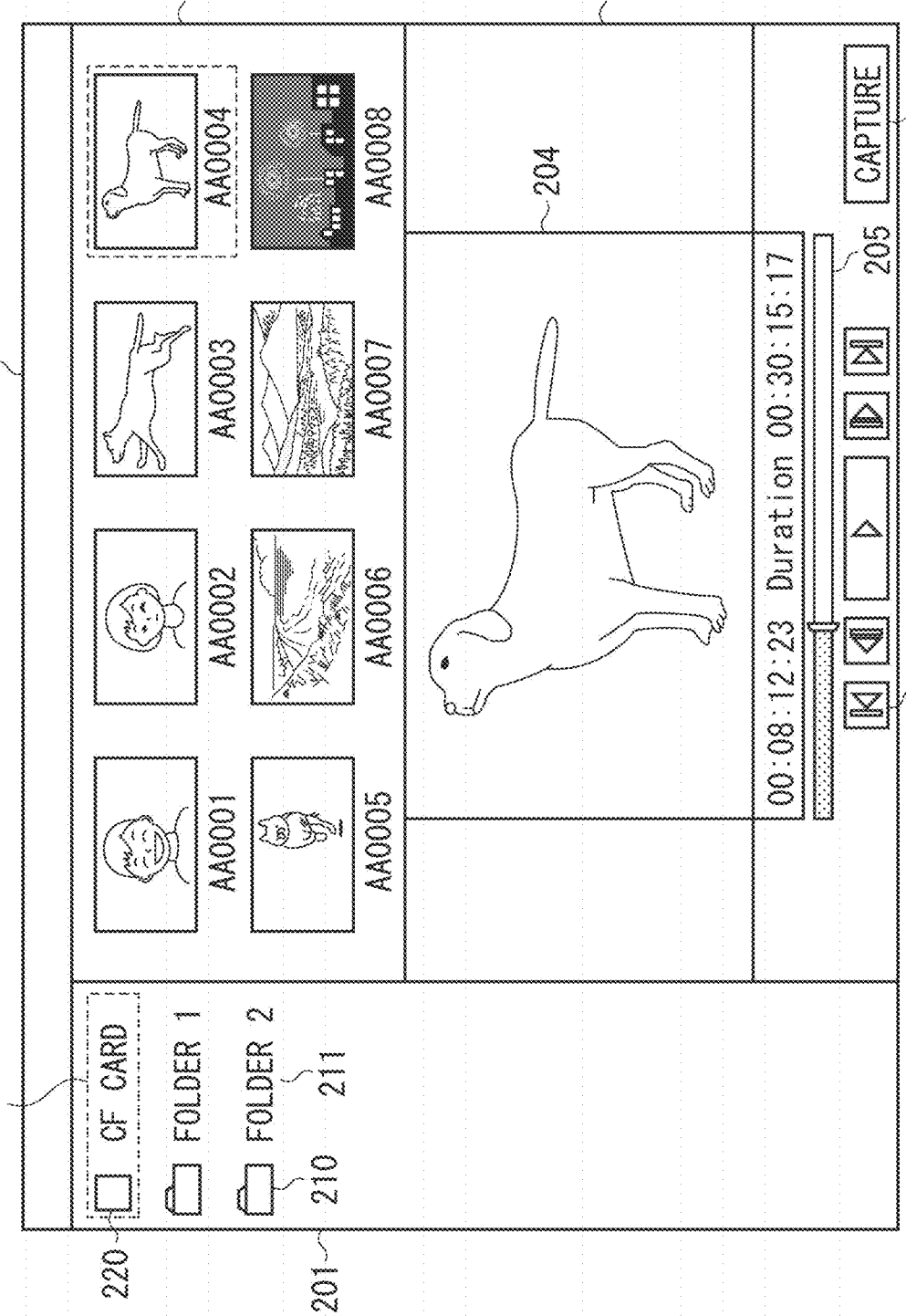
FIG. 2 illustrates an example of a screen according to the exemplary embodiment of the present invention.

The control unit 101 of the information processing apparatus 100 first reads an image processing application from the storage device 104, and activates the image processing application to display a screen 200 as illustrated in FIG. 2 on the display 110.

The screen 200 includes a folder pane 201 that displays folders managed by the image processing application. In addition, the screen 200 includes a moving image list pane 202 that displays a list of representative frames of moving image files associated with a folder selected in the folder pane 201, and a preview pane 203 that displays reproduction of a moving image file selected in the moving image list pane 202.

An icon 210 and a folder name 211 of a folder are displayed in the folder pane 201, and are associated with link information, such as a file path for accessing the folder. In addition, when the flash memory card 150 having a moving image file recorded thereon is connected to the external interface 105, media information pertaining to the flash memory card 150 is displayed in the folder pane 201. As the media information pertaining to the flash memory card 150, an icon 220 and a flash memory card name 221 of the flash memory card 150 are displayed. Paths to the areas in which image files are actually stored (recording position information) are associated with these pieces of link information.

In addition, the image processing application 100 stores the information pertaining to the folders into the storage device 104 in the form of a management file in order to retain these pieces of link information even after the power supply of the information processing apparatus 100 is turned off.

In the preview pane 203, a moving image file selected in the moving image list pane 202 is reproduced and displayed in a preview screen 204. In response to a user operation of a seek bar 205 or a control button 206, reproduction, pausing, fast forward, rewind, frame-by-frame reproduction, frame-by-frame rewind, frame designation, and so on of the moving image file can be realized. When a still image capture button 207 is pressed in response to a user operation, a video frame of the moving image file being displayed in the preview screen 204 is extracted and is stored as a still image file.

Figure 3:
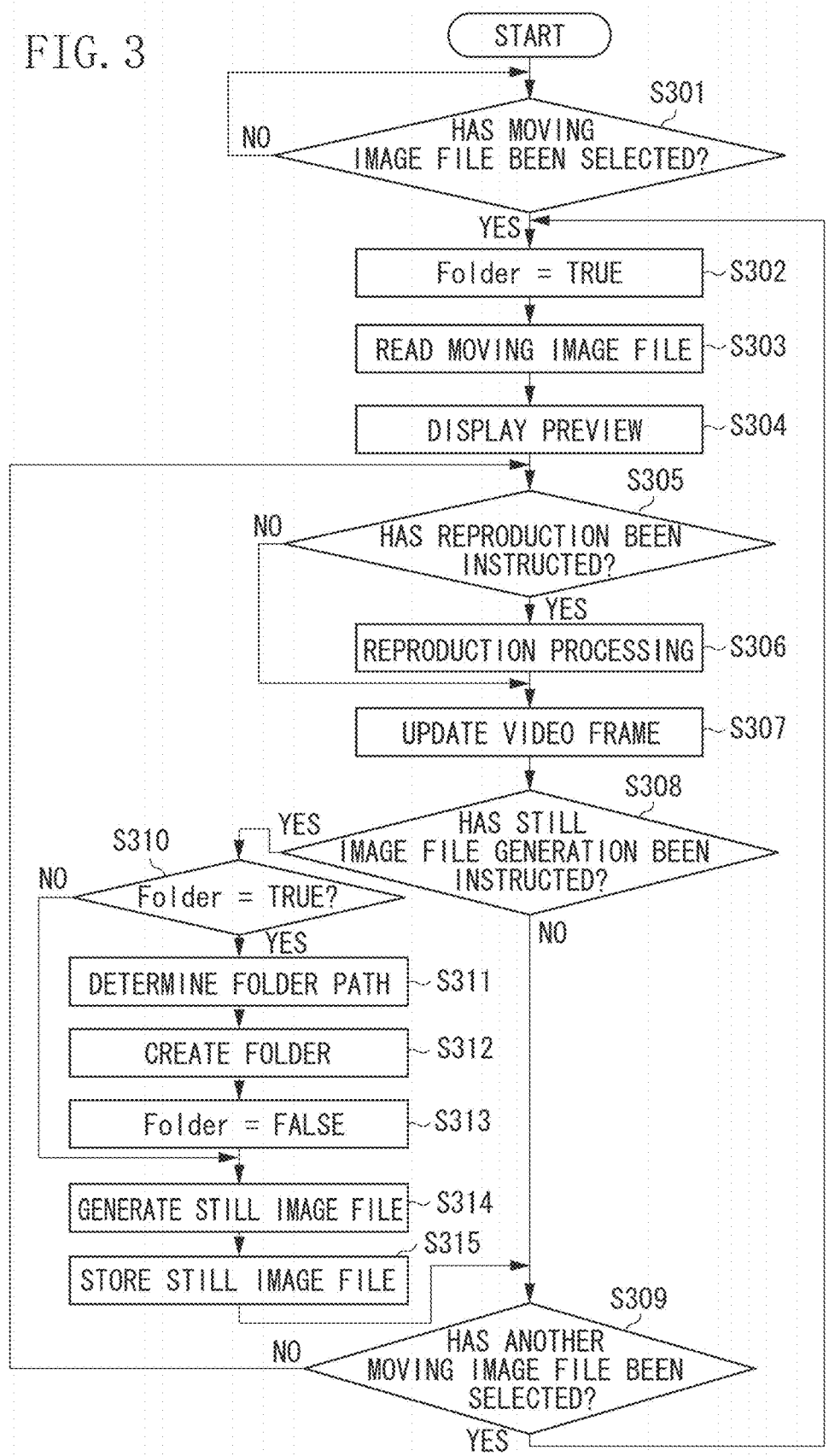
FIG. 3 is a flowchart illustrating an example of an operation of the information processing apparatus according to the exemplary embodiment of the present invention.

Subsequently, image processing performed by the information processing apparatus 100 will be described with reference to a flowchart illustrated in FIG. 3. Hereinafter, the operation of the information processing apparatus 100 is realized by the control unit 101 executing the OS and the image processing application stored in the storage device 104 and so on and controlling each of the modules described above in accordance therewith.

The control unit 101 starts the image processing application to display the screen 200 on the display 110. In step S301, the control unit 101 determines whether a moving image file has been selected from a plurality of moving image files displayed in the moving image list pane 202. If at least one moving image file has been selected (YES in step S301), in step S302, the control unit 101 sets a value of a flag variable Folder used for determining whether a folder needs to be created to TRUE. In step S303, the control unit 101 reads the moving image file selected in step S301 from the storage device 104, and in step S304, the control unit 101 displays the first video frame of the selected moving image file in the preview screen 204. In step S305, the control unit 101 determines whether reproduction of the moving image file has been instructed. If the control unit 101 determines that the reproduction of the moving image file has been instructed in response to a predetermined user operation of the seek bar 205 or the control button 206 (YES in step S305), in step S306, the control unit 101 carries out reproduction processing of the moving image file. In step S307, the control unit 101 updates the video frame to be displayed in the preview screen 204.

In step S308, the control unit 101 determines whether generation of a still image file has been instructed. If the control unit 101 determines, in response to a predetermined user operation of the still image capture button 207, that the generation of the still image file has been instructed (YES in step S308), in step S310, the control unit 101 determines whether TRUE is set to the flag variable Folder. If the value of the flag variable Folder is TRUE (YES in step S310), in step S311, the control unit 101 determines a new folder path for storing a still image in accordance with a predetermined rule. Alternatively, the file name of the moving image file may be appended to a folder path set as desired by the user to generate a new folder path for storing the still image. As another alternative, a different rule may be applied.

In step S312, the control unit 101 creates a folder in accordance with the folder path for storing the still image determined in step S311, and in step S313, the control unit 101 sets FALSE to the flag variable Folder.

In step S314, the control unit 101 generates a still image file by extracting a video frame located between a preset starting point and a preset ending point, and in step S315, the control unit 101 stores the still image file. In addition, the still image file may be generated by extracting a video frame being displayed on the preview screen 204 at a time when a generation instruction is received in step S308.

In step S309, the control unit 101 determines whether another moving image file has been selected in the moving image list pane 202. If the selected moving image file is not changed (NO in step S309), the processing returns to step S305, and the control unit 101 repeats the processes of generating a still image file and storing the still image file into the still image folder.

If the value of the flag variable Folder is FALSE in step S310 (NO in step S310), the control unit 101 does not create a new folder. Thus, while the same moving image file is being reproduced, a still image file generated from a video frame within the moving image file is stored in the same still image folder.

On the other hand, if the selected moving image file is changed (YES in step S309), the processing returns to step S302, and the control unit 101 updates the value of the flag variable Folder to TRUE. Therefore, if another moving image file is reproduced, a still image file generated from a video frame in the other moving image file is stored into another newly created still image folder corresponding to the other moving image file.

Accordingly, still image files generated from moving image files can be stored in different folders according to the original moving image files.

In addition, still image files generated from the same moving image file can be stored into different still image folders according to timings of the generation instructions in the present exemplary embodiment. More specifically, if a generation instruction is provided during reproduction of a moving image file A and still image files a1 and a2 are generated and stored into a still image folder A, a moving image file B is reproduced, a still image file b1 is generated and stored into a still image folder B, and then the moving image file A is reproduced again, a generated still image file is stored not into the still image folder A but into a newly created still image folder AA.

In the present exemplary embodiment, an example is described, in which when the still image capture button 207 is operated, a video frame located between a preset starting point and a preset ending point of a moving image file being displayed on the preview screen 204 is stored as a still image file at a time when a generation instruction is provided. Alternatively, either of the starting point or the ending point may be preset, and a predetermined number of video frames from the set starting point or from the set ending point may be extracted to generate and store a predetermined number of still image files.

As described above, according to the present exemplary embodiment, a folder is automatically created each time a moving image file is reproduced, and still image files generated while the same moving image file is being selected and reproduced are stored collectively into the same folder. In addition, in a case where a moving image file is changed, another folder is newly created, and a storage destination of a still image file is switched. Accordingly, complexity of a user operation for managing a large number of still image files generated from a plurality of moving image files can be reduced.

The present exemplary embodiment can also be realized by carrying out the following processing. Specifically, software (program) that realizes the functions of the exemplary embodiment described above is supplied to a system or to an apparatus through a network or in the form of various storage media, and a computer (or a central processing unit (CPU), a microprocessor unit (MPU), or the like) in the system or in the apparatus then reads and executes the program.

According to the exemplary embodiment, still image files generated from moving image files are automatically stored in units of a moving image file from which the still image files have been extracted, and thus operability for the user to manage the still image files can be advantageously improved.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
a processor; and
a memory storing a program which, when executed by the processor, causes the information processing apparatus to
select one of moving images;
generate a still image based on a video frame extracted from the selected moving image;
store a first still image generated based on a video frame extracted from a first moving image in association with a first folder each time when the first still image is generated until a second moving image which is different from the first moving image is selected;
store a third still image generated based on a video frame extracted from the first moving image in association with a third folder which is different from the first folder each time when the third still image is generated if the first moving image is selected again after the second moving image is selected.

2. The apparatus according to claim 1, wherein the program when executed by the processor further causes the apparatus to display, on a screen, a preview based on a video frame extracted from the selected moving image.

3. The apparatus according to claim 2, wherein the program when executed by the processor further causes the apparatus to update the video frame by performing reproduction process for the selected moving image according to a first instruction of a user.

4. The apparatus according to claim 2, wherein the program when executed by the processor further causes the apparatus to extract the video frame corresponding to the preview displayed on the screen, in response to a second instruction of a user,
wherein the still image is generated from the extracted video frame.

5. The apparatus according to claim 4, wherein the program when executed by the processor further causes the apparatus to generate a new folder when the second instruction is received for the first time after the moving image is selected.

6. A method for managing image comprising the steps of:
selecting one of moving images;
generating a still image based on a video frame extracted from the selected moving image;
storing a first still image generated based on a video frame extracted from a first moving image in association with a first folder each time when the first still image is generated until a second moving image which is different from the first moving image is selected;
storing a third still image generated based on a video frame extracted from the first moving image in association with a third folder which is different from the first folder each time when the third still image is generated if the first moving image is selected again after the second moving image is selected.

7. A non-transitory computer readable storage medium storing a program code that causes a computer to execute a method for managing still image files, the method comprising:
selecting one of moving images;
generating a still image based on a video frame extracted from the selected moving image;
storing a first still image generated based on a video frame extracted from a first moving image in association with a first folder each time when the first still image is generated until a second moving image which is different from the first moving image is selected;
storing a third still image generated based on a video frame extracted from the first moving image in association with a third folder which is different from the first folder each time when the third still image is generated if the first moving image is selected again after the second moving image is selected.

8. An information processing apparatus comprising:
a processor; and
a memory storing a program which, when executed by the processor, causes the information processing apparatus to
select one of moving images;

generate a still image based on a video frame extracted from the selected moving image;

store a first still image generated based on a video frame extracted from a first moving image in association with a first folder before a second moving image which is different from the first moving image is selected in substitution for the first moving image and a second still image is generated from the second moving image;

store a third still image generated based on a video frame extracted from the first moving image in association with a third folder which is different from the first folder if the first moving image is selected again after the second moving image is selected and the second still image is generated from the second moving image.

9. A non-transitory computer readable storage medium storing a program code that causes a computer to execute a method for managing still image files, the method comprising:

selecting one of moving images;

generating a still image based on a video frame extracted from the selected moving image;

storing a first still image generated based on a video frame extracted from a first moving image in association with a first folder before a second moving image which is different from the first moving image is selected in substitution for the first moving image and a second still image is generated from the second moving image;

storing a third still image generated based on a video frame extracted from the first moving image in association with a third folder which is different from the first folder if the first moving image is selected again after the second moving image is selected and the second still image is generated from the second moving image.

* * * * *